Figure 1:
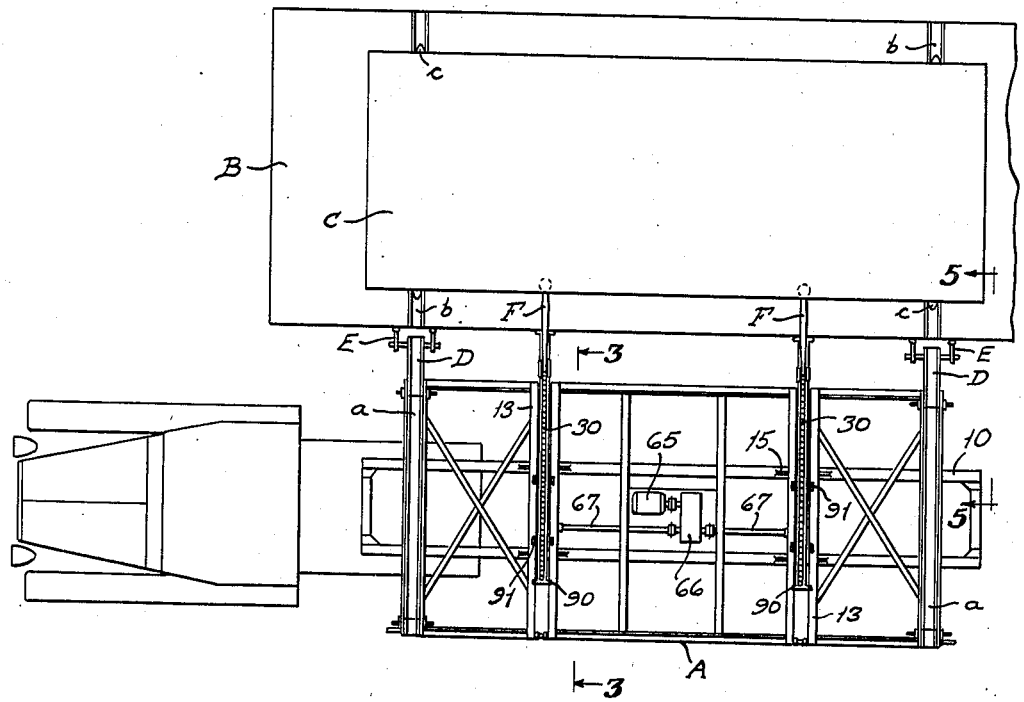

Sept. 8, 1942.   R. A. NORBOM   2,294,928
MECHANISM FOR TRANSFERRING FREIGHT
Filed Feb. 24, 1941   4 Sheets-Sheet 1

INVENTOR.
Ragnar A. Norbom
BY Dakin, Tears McBean
Attorneys

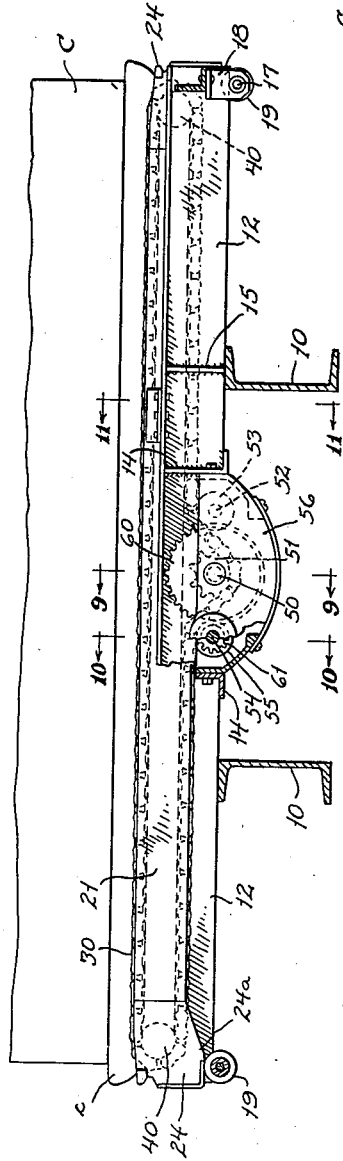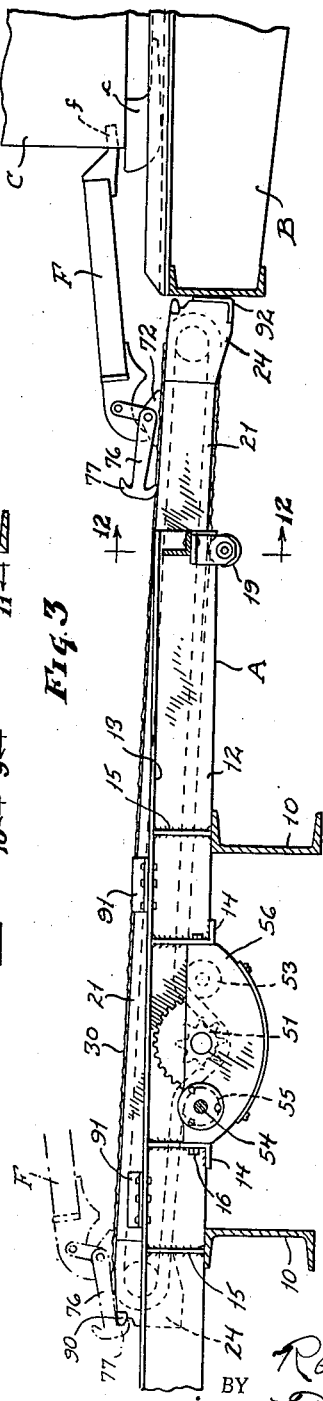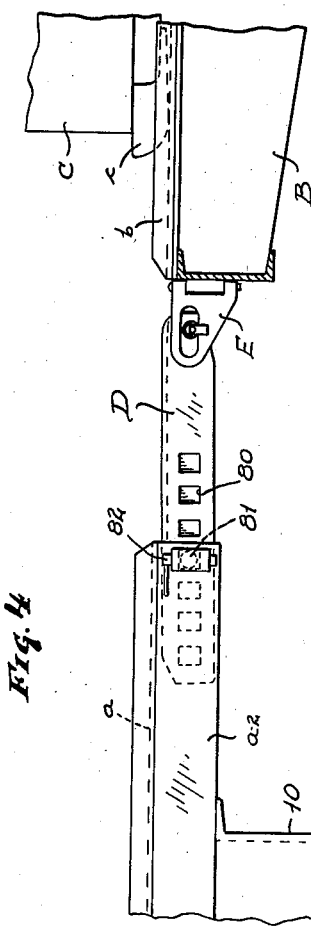

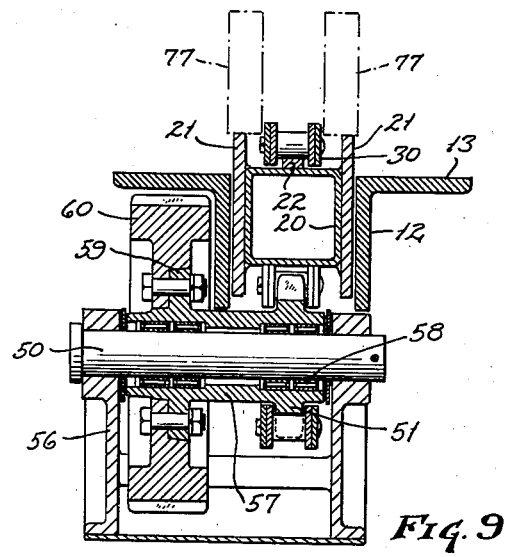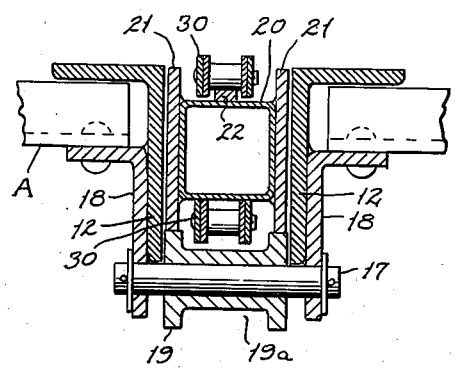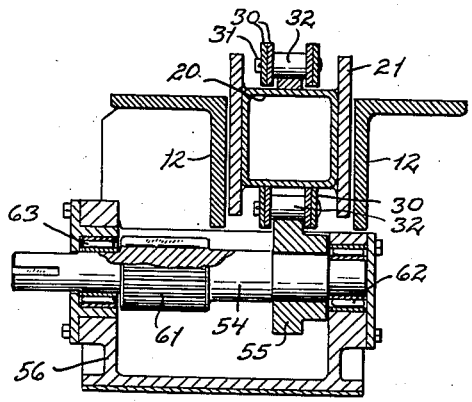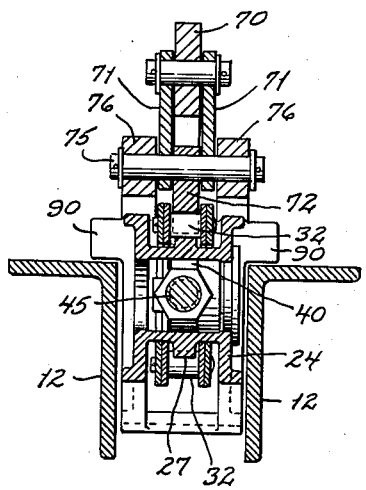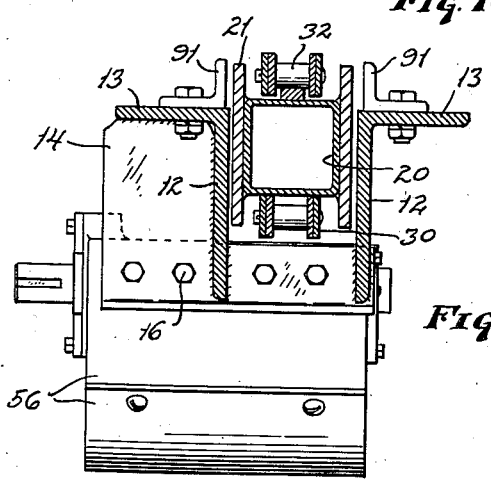

Patented Sept. 8, 1942

2,294,928

UNITED STATES PATENT OFFICE 2,294,928

MECHANISM FOR TRANSFERRING FREIGHT

Ragnar A. Norbom, New York, N. Y., assignor to National Fitch Corporation, New York, N. Y., a corporation of Delaware Application February 24, 1941, Serial No. 380,242

9 Claims. (Cl. 214—38)

This invention relates to a system of transferring freight in demountable containers, which may be transported on highway trucks or railway cars and shifted from one to the other in a combined truck-haul and rail-haul operation. The primary object of the invention is to provide effective mechanism carried by the highway truck and operative to shove the container on the truck onto an adjacent vehicle or to pull the container from such vehicle onto the truck.

My invention is in the nature of an improvement on the body-transferring mechanism shown, described and claimed in pending application No. 361,566, filed October 17, 1940, by Benjamin F. Fitch and myself, jointly, and assigned to the assignee of this application, the National Fitch Corporation.

Like the invention of that application, I provide a shiftable carriage mounted on a truck, and a propelling chain partly on the carriage and partly engaging a driving sprocket rotatably mounted on the truck frame, and a push-and-pull bar adapted to connect the chain with the container. The operation of the chain may shift the carriage partially beyond the edge of the truck at either side thereof, enabling the push-and-pull bar to be attached to the chain and to the container, when the latter is in transporting position directly over the truck frame. Then, by operating the carriage or chain or both together, the container may be shifted not only off of the truck but beyond it onto a freight car or other adjacent vehicle. By a reverse operation the container may be drawn from the railway car or other support into position directly over the frame of the truck in position suitable for transportation.

My invention includes several features contributing to the efficiency of the operation above outlined. These features include means for insuring the shifting of the carriage by the operation of the chain; an improved means for attaching the push-and-pull bar to the carriage; improved supports and limit stops for the carriage; improved supports for the chain, and improved driving gear for the chain. All of these features will be apparent from the following detailed description of embodiment illustrated in the drawings hereof.

Figure 2:
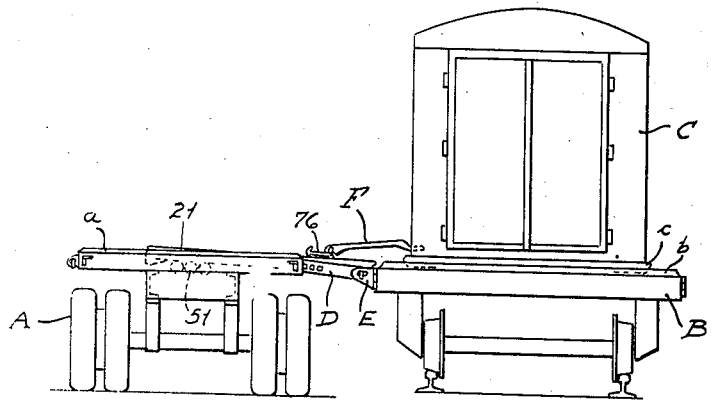
Figure 7:
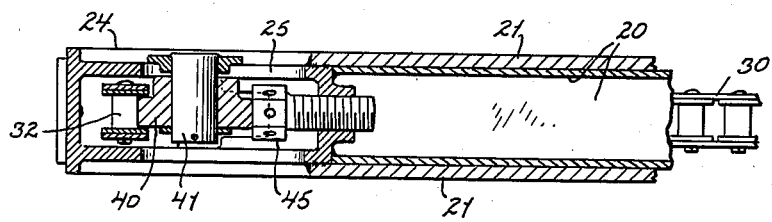
Figure 6:
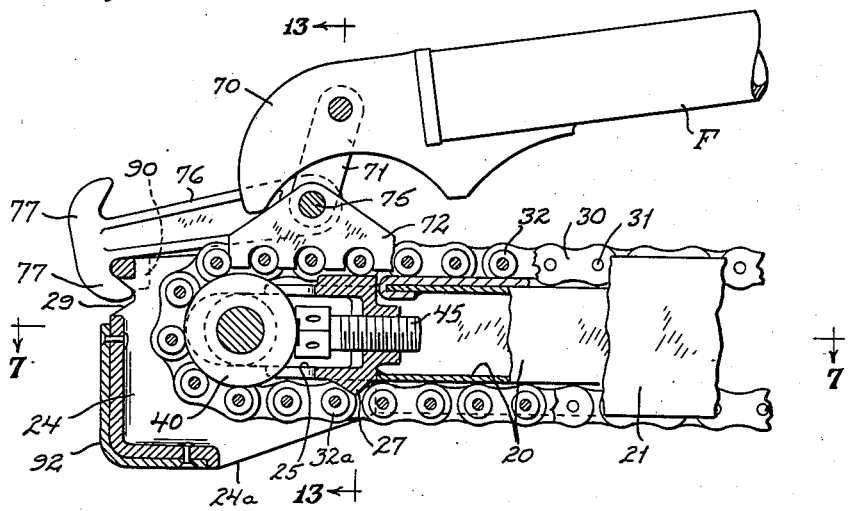
Figure 8:
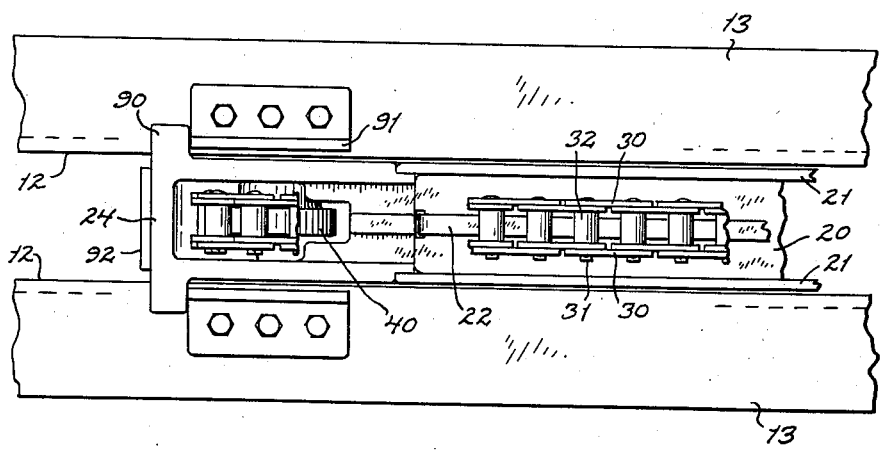

In the drawings, Fig. 1 is a plan of my improved highway vehicle, a portion of an adjacent railway car and a container on the car connected by push-and-pull bars with transfer mechanism on the highway vehicle; Fig. 2 is an end view of the parts shown in Fig. 1; Fig. 3 is a vertical cross-section through the truck on the line 3—3 on Fig. 1, but with the body indicated in its transporting position on the truck; Fig. 4 is a vertical section in the same plane as Fig. 3 but with the parts in position for pulling the container from the flat car; Fig. 5 is a sectional elevation in the plane indicated by the line 5—5 in Fig. 1, illustrating the bridge connecting the truck and railway car; Fig. 6 is an enlarged vertical section illustrating the attachment of the push-and-pull bar to the shiftable carriage, in the position indicated by broken lines at the left hand end of Fig. 4; Fig. 7 is a horizontal section from the line 7—7 on Fig. 6; Fig. 8 is a fragmentary plan illustrating one of the extreme positions of the shiftable carriage; Figs. 9, 10 and 11 are cross sections through the carriage and chain mounted thereon, as indicated by the correspondingly numbered lines on Fig. 3; Fig. 12 is a detail of the carriage, its housing and supporting roller being a vertical section on the line 12—12 in Fig. 4, and Fig. 13 is a vertical section through the end casting of the carriage and the push-and-pull bar connection therewith, as indicated by the line 13—13 on Fig. 6.

Referring first to Figs. 1 and 2, A indicates a highway truck, which may be of the tractor-trailer type; B indicates a railway flat car, and C a container. Each of such vehicles is equipped on its upper face with transverse channels $a$ and $b$ respectively, which may receive skid rails $c$ on the under side of the container. The main frame of the truck is provided on each side with a pair of bridges D which may extend various distances from the side of the truck and are adapted to be attached at their far ends to the side of the railway car, which is equipped with attaching devices, indicated at E. The propelling mechanisms on the truck about to be described are connected with the container by push-and-pull bars F attached at one end to the side of the container near its base and at the other end to the laterally traveling propelling chains on the truck.

Referring now to Figs. 3 to 11 inclusive, the main sills of the chassis on the truck A are shown as a pair of outwardly facing channel beams 10. On top of these beams, extending crosswise thereof, are a pair of transverse angle beams having vertical flanges 12 and horizontal outwardly facing flanges 13. The flanges 12 are spaced apart to house the carriage and guide it by their inner faces. The angle beams are connected with the longitudinal chassis beams 10 by gussets 15 welded to the vertical flanges 12, to the horizontal flanges 13, and to the longitudinal beams. At their free ends the flanges 12 are tied together by cross rods 17 mounted in bracket plates 18 welded to the sides of the flanges 12 and these rods carry rollers 19 between the brackets, making a support for the carriage, as will be more fully described.

It will be understood that the construction just described is duplicated, so that it occurs at two spaced regions on the truck.

In the two housings provided by the transverse angle beams 12 are two chain-carrying carriages which will now be described. Each carriage, as shown, is composed of a hollow, substantially square, beam 20, Figs. 9 to 12, to the opposite vertical faces of which are welded reinforcing plates 21. These plates extend above and below the hollow beam and provide, in effect, channels along the top and bottom of the beam. On the upper face of the hollow beam is a substantially flat supporting bar 22 which forms a guide for the upper reach of the endless chain carried by the carriage. This chain extends around supports near the ends of the carriage and thence beneath it where it engages driving mechanism later explained.

The chain is composed of overlapping side links 30 arranged in two spaced series, transverse pins 31 pivoting the overlapping links together and connecting the two series to each other in spaced relation, and rollers 32 on the pins between the innermost links. This chain lies in a vertical course, the upper reach being horizontal, with the rollers 32 resting or rolling on the bar 22.

The supports on the carriage around which the chain loops are a pair of wheels 40, each of which is journalled on a pin 41, which is slidably mounted in a guideway 25 carried by the end casting 24 which forms a continuation of the plates 21 of the carriage. Each wheel 40 is abutted by a screw 45 which is threaded in the casting 24. The angular heads of the screws 45 are accessible through openings between guideways 25 on the carriage, thus enabling the wheels 40 to be shoved outwardly to provide a proper tension on the chain. The rollers 32 of the chain engage the periphery of the wheels 40, while the links overhang the sides of the wheels, as illustrated in Fig. 7, thus guiding the chain and enabling it to roll freely around the wheel which may be stationary.

The carriages are adapted to be projected to either side of the truck by operation of their chains, as later described. When so projected the carriage is adapted to assume an angle below the horizontal, so that it may more surely abut an adjacent vehicle below its upper edge, as shown in Fig. 4. To this end the castings 24 are provided with depending projections 24a at the ends of the carriage, which rest upon the rollers 19 when the carriage is in the central traveling position of the truck, as shown in Fig. 3. When the carriage is moved outwardly, however, the leading projection 24a rides off the roller and the carriage is henceforth supported at an angle, with the lower edges of its side plates 21 resting on the roller 19, while the chain, which in its intermediate region extends lower than the side plates, as shown in Figs. 6 and 12, occupies an intermediate groove 19a in the roller 19.

The chain is adapted to be engaged by the push-and-pull bar, the other end of which is attached to the container, as hereinafter explained. The chain may move relative to the carriage or more as a unit with the carriage and in either case may effect the shifting of the container through the push-and-pull bar.

At the center of the truck is a stationary shaft 50, carrying a sprocket wheel 51, and on opposite sides of this shaft are shafts 52 and 54 carrying wheels 53 and 55 respectively. Chain 30 is endless, its lower reach passing beneath the sprocket 51 and in engagement with it on each side thereof by reason of passing over the adjacent wheels 53 and 55. The shaft 54 is rotatably mounted on the chassis of the truck and preferably journalled in bearings in a housing 56 which carries also the shafts 50 and 52 and is removably mounted on the truck frame. This removable mounting is effected by cutting out a portion of the vertical flange 12 of the transverse beams at the central region and welding cross angle clips 14 to the beams, as illustrated in Figs. 3 and 11, the housing 56 standing between these clips and being secured thereto by bolts 16.

The sprocket 51 is the driving sprocket for the chain. It is provided with an integral extension sleeve 57, Fig. 9, and is journalled by roller bearings 58 on the supporting shaft 50. Secured to a flange 59 integral with the sleeve 57 is a spur gear 60 which meshes with a driving pinion 61 formed on the parallel shaft 54, Figs. 3 and 10. This shaft is journalled in roller bearing 62 and 63 carried by the housing 56 and is driven by the motor 65 which, through reducing gearing in a housing 66, Fig. 1, operates the aligned shafts 67 which are coupled to the pinion shafts 54. The reduction gearing includes a worm and wormwheel, which render the chain self-locking in any position.

When the motor 65 is operated, the driven shafts 54 rotate the corresponding pinions 61 and through them the gears 60 and thus rotate the driving sprockets 51 to move the chains. Now, if the carriage is held stationary, the propelled chain will travel about the two wheels 40 mounted on the carriage at its ends. If, however, the carriage is free to move it is possible for the chain to pull the carriage.

To insure the shifting of the carriage, by the chain, I provide a downwardly facing lug 27 on each end casting 24. As shown in Figs. 6 and 13, this lug projects into the path of the chain rollers 32. The lugs, therefore, introduce an obstruction to the independent movement of the chain and insure the carriage moving with the chain, if the carriage is free to move. As an illustration, if the lower reach of the chain in Fig. 6 is drawn toward the right by the sprocket 51, a chain roller indicated at 32a will engage the inclined surface of the lug 27, insuring the free carriage moving with the chain toward the right. However, at any time when the carriage is held from movement as hereinafter explained, the chain may travel across the lugs without undue friction.

The push-and-pull bar F may be formed according to Patent No. 2,087,249 of Benjamin F. Fitch, issued July 20, 1937. It has, at its one end, a flattened head f, Fig. 4, which may pass through a vertical slot in the side of the container. When the push-and-pull bar is held so that the head is at right angles to the position shown in Fig. 4, and then when the bar is turned into the position there shown, this head f lies behind the walls of the slot, thus anchoring the bar at that end. At its other end the bar F has a downwardly facing curved portion 70 at the opposite sides of which are pivoted a pair of links 71. Below the bar these links carry a block 72 having downwardly facing teeth which are adapted to extend into the spaces between the rollers 32 of the chain, the teeth curving outwardly slightly to extend beneath these rollers.

The pin 75 by which the links 71 are pivoted to the block 72 also carries a pair of anchors 76, each having two heads 77, the lower ones of which are adapted to engage in recesses 29 in the castings 24 of the carriages. The anchors 76 are shown in detail in Fig. 6, and, being on the outer sides of the block 72, they may extend in the direction there shown, or be swung down and over, before the block 72 is placed on the chain, to extend in the opposite direction to engage the corresponding recess 29 at the other end of the carriage. Whenever the anchors are in engagement with the carriage, as shown in Fig. 6, it is evident that the push-and-pull bar, chain and carriage are all locked together so that a movement of the chain moves both the carriage and the push-and-pull bar.

When the chain is moving with reference to the carriage and the push-and-pull bar is attached to the chain but not to the carriage, the anchor heads 77 slide along the upper edges of the carriage plates 21, as shown in Fig. 9, and near the right hand portion of Fig. 4.

The carriage is limited at the extreme end of its movement in either direction by outward lugs 90 on the carriage, which are adapted to engage brackets 91 secured to the top flanges 13 of the angle bars 12, Figs. 4 and 8. The end of the carriage is formed with a bumper strip 92, preferably of yielding material, to cushion the blow as the carriage strikes the adjacent vehicle.

I have referred to the bridges D connecting the truck to the adjacent vehicle. As indicated in Fig. 5, these bridges are slidable, when not in use, into the transverse housings a—2 carried by the truck frame. When in use they extend various selected distances out of the housings, as indicated at Fig. 5, and are pivotally locked in such position by suitable latches 81 in the sides of the housing. The construction may be such that each bridge has a row of recesses 80 on its opposite sides, any of which may be occupied by a ball 81, forced toward the bridge by a camming device 82 on the side of the housing. When the truck is brought into position to the side of the railway car the bridges are drawn out toward the car and the free ends are attached to the car wings E and the ball locks 81 applied to lock the bridge pivotally to the truck.

In considering the operation of this transfer system, suppose a truck arrives empty adjacent a flat car, supporting a container, as illustrated in Figs. 1 and 2, and it is desired to draw such container from the car onto the truck. The first operation after the bridges D are attached is to operate the driving sprocket 51 in the counter-clockwise direction as viewed in Fig. 3. This pulls on the left hand portion of the lower reach of the chain and thus pulls the free carriage toward the right, the lug 27 of the carriage being engaged by the chain in this movement. The carriage thus continues to move in this direction until it is stopped either by its shoulders 90, at the left hand end, engaging the stops 91, or, more usually, by the right hand end of the carriage abutting the side of the car, as shown in Fig. 4.

When the carriage has been thus projected until stopped, the power is turned off the motor; then the push-and-pull bar F is attached to the container, and the free end of the bar is attached to the upper reach of the chain by the toothed block or jaw 72, of the push-and-pull bar, with the anchors 76 extending in the direction of intended travel. Now, the power is turned on in the same direction as before and this again pulls the lower reach of the chain toward the right. As the carriage can move no further toward the right, the pull on the lower reach of the chain is transmitted to movement of the upper reach toward the left relative to the carriage and this pulls the container along over the bridges and partially onto the truck until the pull bar is near the end of its possible travel.

When in this movement the push-and-pull bar reaches the end of its travel toward the left, the anchors 76 which have been projecting toward the left and have been riding freely on top of the side plates, as indicated in the right hand portion of Fig. 4, reach the left hand end of the carriage, the free ends of the anchors drop and their lower hooks pass downwardly across the left hand end of the carriage. Now, if the motor be reversed, so that the driving sprocket 51 is moving in a clockwise direction, as viewed in Figs. 3 and 4, this pulls the lower reach toward the left, causing the upper reach to travel toward the right, thus bringing the hook of the anchors into the recess 29 at the left hand end of the carriage, as shown in Fig. 6. Thereupon, since the chain can no longer move relative to the carriage, it pulls the carriage with it toward the left, so that the container comes into the central position over the truck.

When the container comes into central position on the truck, the push-and-pull bar is removed from the carriage chain and container, and it is only necessary to operate the driving sprocket 51 in the counter-clockwise direction to pull the carriage back to original mid-position. The truck is then ready for transportation movement after the bridges have been disconnected from the car and the container suitably locked on the truck. This is the position illustrated in Fig. 3.

When a truck arrives loaded adjacent a flat car, for instance, at the right hand side thereof (Fig. 1), the first operation is to rotate the driving sprocket 51 in the clockwise direction pulling the carriage out to the left. Then the push-and-pull bar is attached to the chain with the anchors 76 projecting toward the right and riding freely on the carriage plates 21. Now the movement of the driving sprocket 51 in the clockwise direction is continued. This tends to pull the carriage farther toward the left, but its movement in that direction is limited by reason of the engagement of the projections 90 thereon with the fixed stops 91; accordingly, the chain travels on the carriage, and the upper reach of the chain moves toward the right causing the container to be pushed part way onto the flat car. The anchors 76 eventually reach the right hand end of the carriage and drop thereover.

Now the direction of rotation is changed so that the main sprocket 51 rotates in the counter-clockwise direction. This pulls on the left hand portion of the lower reach of the chain and as the upper reach is anchored by the anchors 76, the whole carriage must move to the right. This movement continues until the container is in proper position on the flat car. When this is effected, the push-and-pull bar is detached and the motor is operated in a reverse direction to rotate the main sprocket 51 in a clockwise direction, thus pulling the carriage back to the mid-position of Fig. 3.

It will be seen, that all movements desired in the shifting of the container are effected from a single motor merely by changing its direction of rotation at the proper time.

The retarding lugs on the carriage, coacting with the chain, insure the chain pulling the carriage in the desired direction when the carriage is free to move. The abutments on the carriage form effective stops limiting its extreme position, and the anchors described form a very effective connection between the push-and-pull bar and the carriage to enable the push-and-pull bar, carriage and chain to be locked together for operation as a unit.

By supporting the chain at the ends of the carriage on idler rollers instead of sprockets, a simple and effective adjustment may be provided for tensioning the chain, since it is not necessary for the wheels, about which the chain loops, to rotate. By grooving the rollers supporting the carriage, I enable such rollers to engage the carriage independently of the chain, which may depend into the grooves. I thus effectively support the carriage and leave the chain free to draw the carriage by means of the retarding lug, or to travel across such lugs according to whether the carriage is free for movement or otherwise.

By arranging the central drive so that the main gear is bolted to the hub of the main sprocket instead of driving through a shaft, I provide a more dependable operation adapted to meet excessive stresses without danger to the shaft. By mounting of the parts of the drive in a single removable housing, I provide not only for convenient installation, but for convenient removal for repairs.

By arranging the anchors to project nearly horizontally beyond the push-and-pull bar jaw and to coact with the extreme end of the carriage, I make a more positive engagement than heretofore. There being no teeth on the wheel about which the chain loops, which would interfere with the push-and-pull bar jaw, I can run such jaw further out toward the end of the carriage and I am thus enabled to shorten the push-and-pull bar.

All of these different features which I have just summarized have contributed to a material increase in the efficiency and reliability of the operation over that shown in the prior application mentioned.

I claim:

1. In a freight transferring mechanism, the combination of a vehicle adapted to carry a container, a carriage on the vehicle shiftable to project beyond the edge thereof, an endless chain looping around the carriage, means on the vehicle for driving the chain, and a projection on the carriage in the path of movement of the chain and frictionally engaging the chain to insure the chain moving the carriage when the carriage is free.

2. In a freight transferring mechanism, the combination of a vehicle, a carriage movable thereon, an endless chain looped about the carriage, means on the vehicle for driving the chain and an inclined surface on the carriage across which the chain may travel when the carriage is locked, said inclined surface effecting a frictional driving engagement for the carriage when the latter is free.

3. The combination of a vehicle, a bodily shiftable carriage thereon, an endless chain lying in a vertical plane and looped around supports mounted on the carriage adjacent its opposite ends, a sprocket wheel on the vehicle meshing with the chain and adapted to drive it, and a downward projection on the carriage adapted to engage a lower reach of the chain by an inclined surface, whereby the projection provides a retarding device when the carriage is free, while leaving the chain able to move with reference to the carriage when the latter is locked.

4. The combination of a vehicle, a shiftable carriage thereon, an endless chain extending lengthwise of the carriage and looped about supports at each end thereof, a push-and-pull bar having a jaw adapted to connect with the chain, a pair of anchor members pivotally attached to the opposite sides of the push-and-pull bar and adapted to extend in either direction and having a downwardly facing hook and an upwardly facing hook, one or the other of which hooks is adapted to engage the carriage according to the direction in which the anchor extends.

5. The combination of a vehicle, a shiftable carriage thereon, an endless chain extending lengthwise the carriage and looped about supports on the carriage adjacent its two ends, a push-and-pull bar adapted to be connected at one end to the container, a jaw connected to the other end of the push-and-pull bar and adapted to engage chain rollers between the side links thereof, a pair of anchor bars pivoted to the jaw on its opposite sides respectively, said anchor bars being so positioned that intermediately they will ride on the carriage on opposite sides of the chain, each anchor bar having an upward and a downward hook at its free end whereby the anchor may be effective when projecting in either direction to engage the carriage.

6. The combination of a vehicle, a bodily movable carriage extending transversely of the vehicle, guideway for the carriage, a pair of rollers adjacent the opposite sides of the carriage forming supports for opposite ends of the carriage, each roller being intermediately grooved, portions of the rollers outside of the grooves engaging the carriage, an endless chain extending lengthwise of the carriage and looped about supports thereon adjacent to the ends of the carriage, the under-reaches of the chain being adapted to depend into the grooves of the rollers, while the carriage rests on the rollers above the grooves when the carriage is projecting beyond the side of the vehicle.

7. The combination of a vehicle, a shiftable carriage thereon, an endless chain extending lengthwise of the carriage, lying in a vertical plane and passing around supports adjacent to the ends of the carriage, a pull bar provided with a shoe adapted to engage the chain in various regions thereof, an anchor pivotally connected to the pull bar and adapted to overhang the end of the carriage and engage such end, whereby the chain may extend for nearly the full length of the carriage.

8. The combination of a vehicle, a movable carriage thereon, a grooved roller on the vehicle engaging the underside of the carriage, a chain mounted on the carriage and having a reach extending on the underside thereof and adapted to pass into the groove of the roller, and means on the vehicle for operating the chain.

9. The combination of a vehicle, a shiftable carriage thereon, a movable chain on the carriage extending lengthwise thereof, a pull bar provided with a jaw for engaging the chain, an anchor connected to the jaw and pull bar and adapted to extend horizontally beyond the chain when the jaw engages the chain, a shoulder on the carriage beyond such chain which the anchor may then engage, and means for moving the carriage.

RAGNAR A. NORBOM.